United States Patent [19]

Longinotti

[11] 4,180,361
[45] Dec. 25, 1979

[54] PLANT FOR HANDLING CEMENT TILES AND SIMILAR ARTICLES THAT REQUIRE A SEASONING AND SUBSEQUENT WORKINGS

[76] Inventor: Enrico Longinotti, Via Timoteo Bertelli 2, Firenze, Italy

[21] Appl. No.: 892,134

[22] Filed: Mar. 31, 1978

[30] Foreign Application Priority Data

Apr. 15, 1977 [IT]  Italy ................................. 9413 A/77

[51] Int. Cl.² ............................................. B65G 60/00
[52] U.S. Cl. ........................................ 414/32; 414/41; 414/43; 414/69; 414/96; 414/127; 414/225; 414/564
[58] Field of Search ................... 214/152; 414/786, 32, 414/41, 42, 43, 69, 96, 127, 564, 222, 225

[56] References Cited

U.S. PATENT DOCUMENTS

| | | | |
|---|---|---|---|
| 3,523,617 | 8/1970 | Raynor | 414/32 |
| 3,895,477 | 7/1975 | Yamashita | 414/32 |

*Primary Examiner*—Stephen G. Kunin
*Assistant Examiner*—George F. Abraham
*Attorney, Agent, or Firm*—McGlew and Tuttle

[57] ABSTRACT

Plant for handling cement tiles and similar articles that require a seasoning and subsequent workings.

It includes: trays set up to be superimposed on one another and to slide along a track with a stripping station, a station to pile up the trays, an un-piling station of said trays and a station to pick up the tiles; the piles of trays are picked up beyond the piling station for the seasoning and are laid down again on the track before the un-piling station.

7 Claims, 40 Drawing Figures

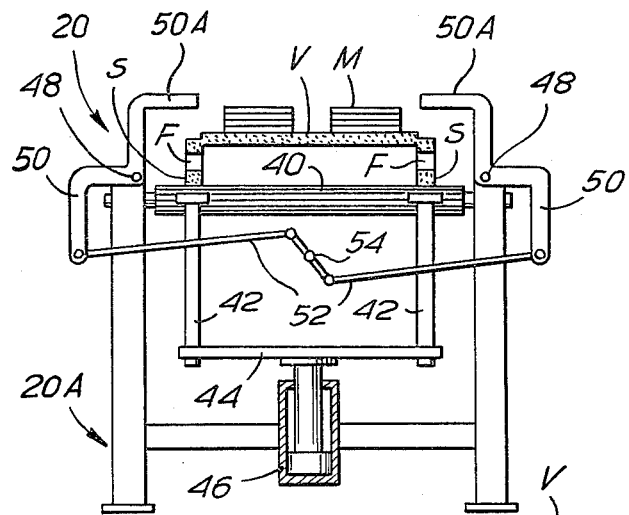
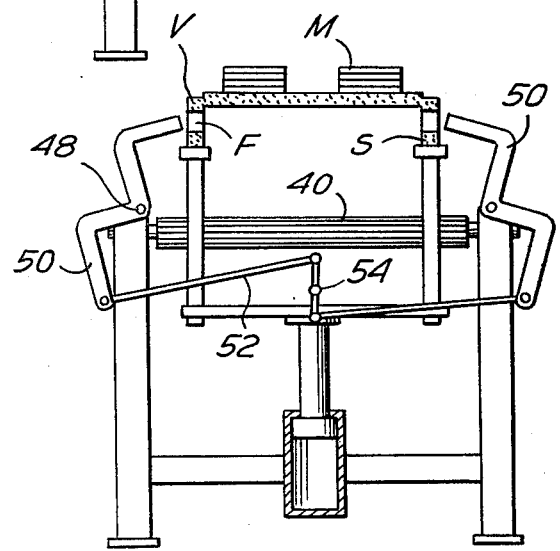
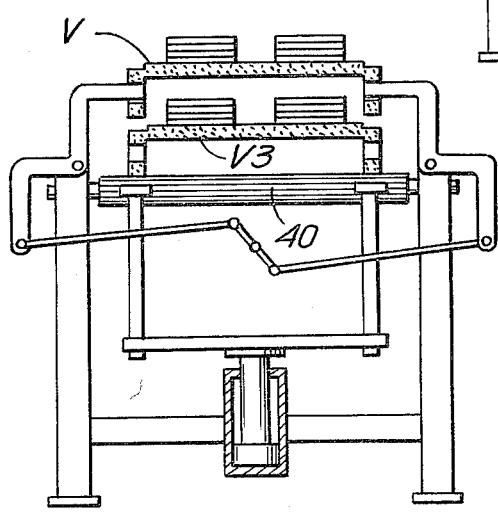

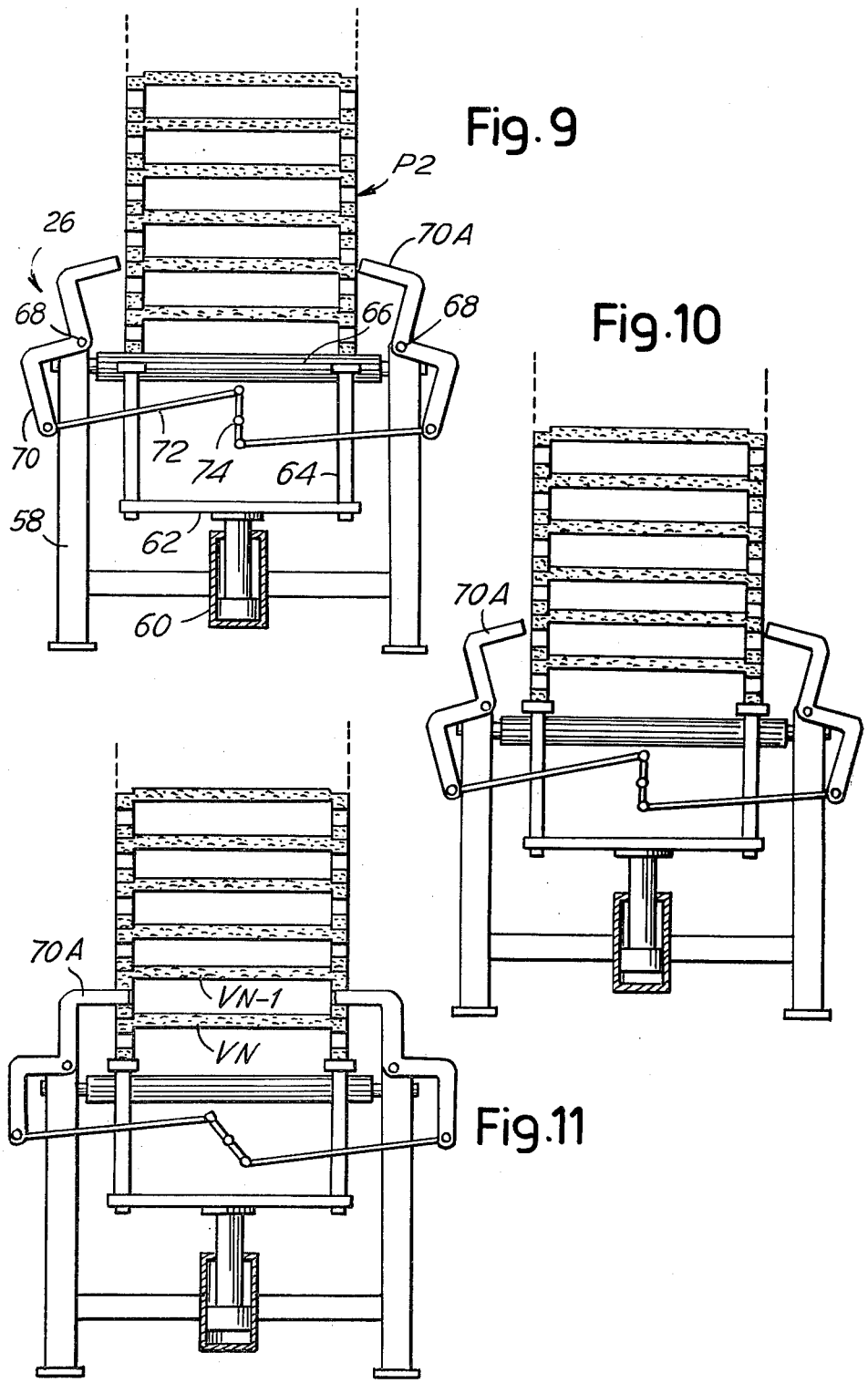

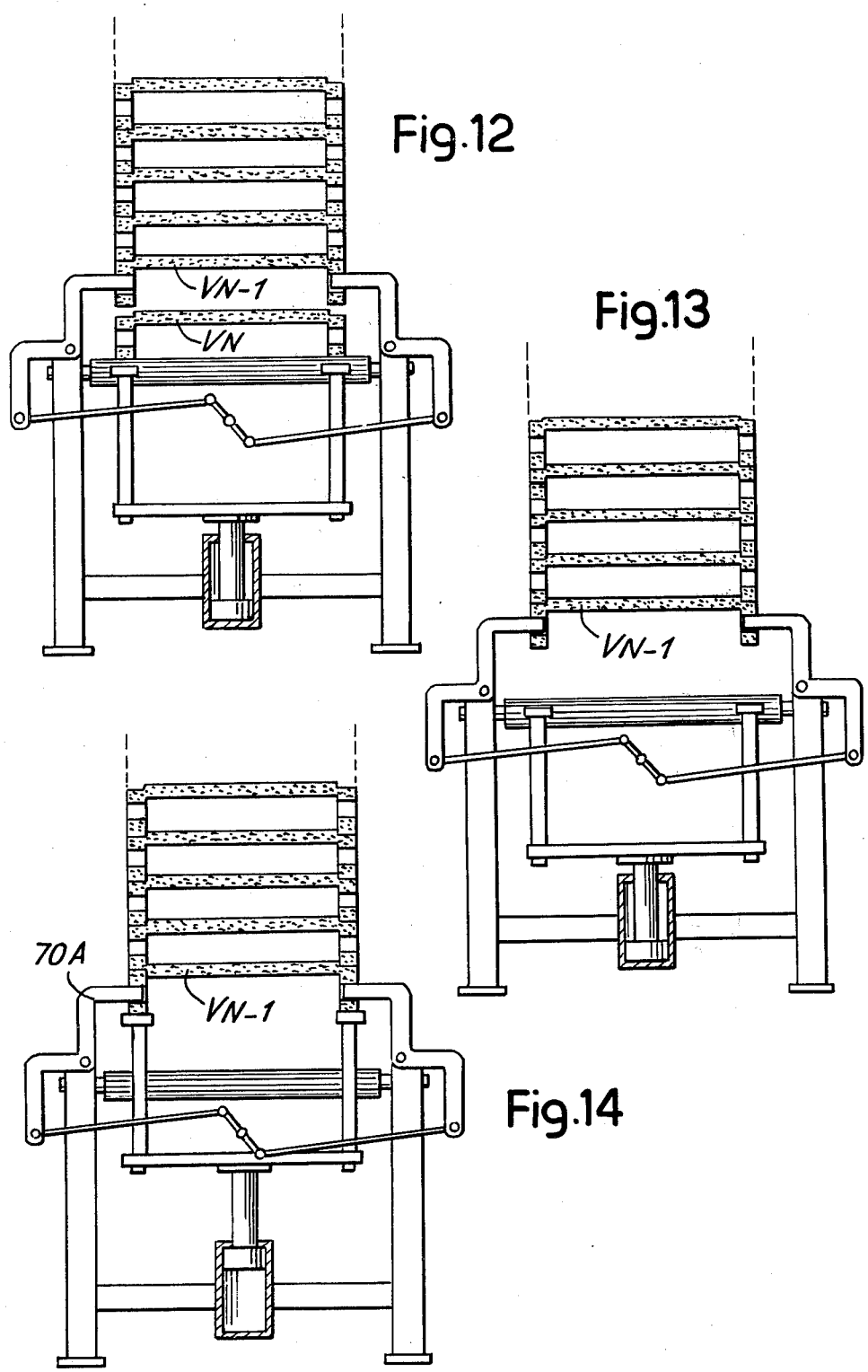

PLANT FOR HANDLING CEMENT TILES AND SIMILAR ARTICLES THAT REQUIRE A SEASONING AND SUBSEQUENT WORKINGS

The invention concerns a plant for handling cement tiles and similar articles that require seasoning after being formed in the press or equivalent machine and, after seasoning, have to undergo further workings such as smoothing or other operation whereby the tiles or the like are borne by trays in which they are laid down possibly piled up by automatic pick up means which take them from the press or the like. The purpose of the invention is to perform a more rational handling with limited costs and dimensions.

Substantially, the plant according to the invention includes: trays set up to be superimposed or stacked on one another without interfering with the tiles laid down on them; a track with a stripping station and a subsequent station to pile up the trays; a track with an un-piling station of said trays and subsequently the station to pick up the tiles; means to pick up the piles of trays beyond the piling station, to forward them to the seasoning cells; and means to return said piles before the un-piling station.

The piling and un-piling means in the respective stations in practice includes: a raising and lowering device of a tray or a pile of trays being formed, and a side support system of the second tray from below the pile of trays, to allow the addition of a tray to the pile being formed, respectively the moving away of a tray from the pile to be un-piled. The side support system can be provided with two oscillating jaw members, symmetrically arranged and actuated to be engaged in side seats of the tray to be supported.

The drawing shows a practical non limitative embodiment.

FIGS. 3, 4, 5, 6, 7 and 8 show a schematic vertical and transversal view illustrating the piling up device in several positions;

FIGS. 9 to 19 show in a vertical cross-section the un-piling device in several arrangements thereof during its operation;

FIG. 24 shows perspectively an assembly of trays that can be piled up and can be handled by means of a fork truck or the like;

Figure 1:
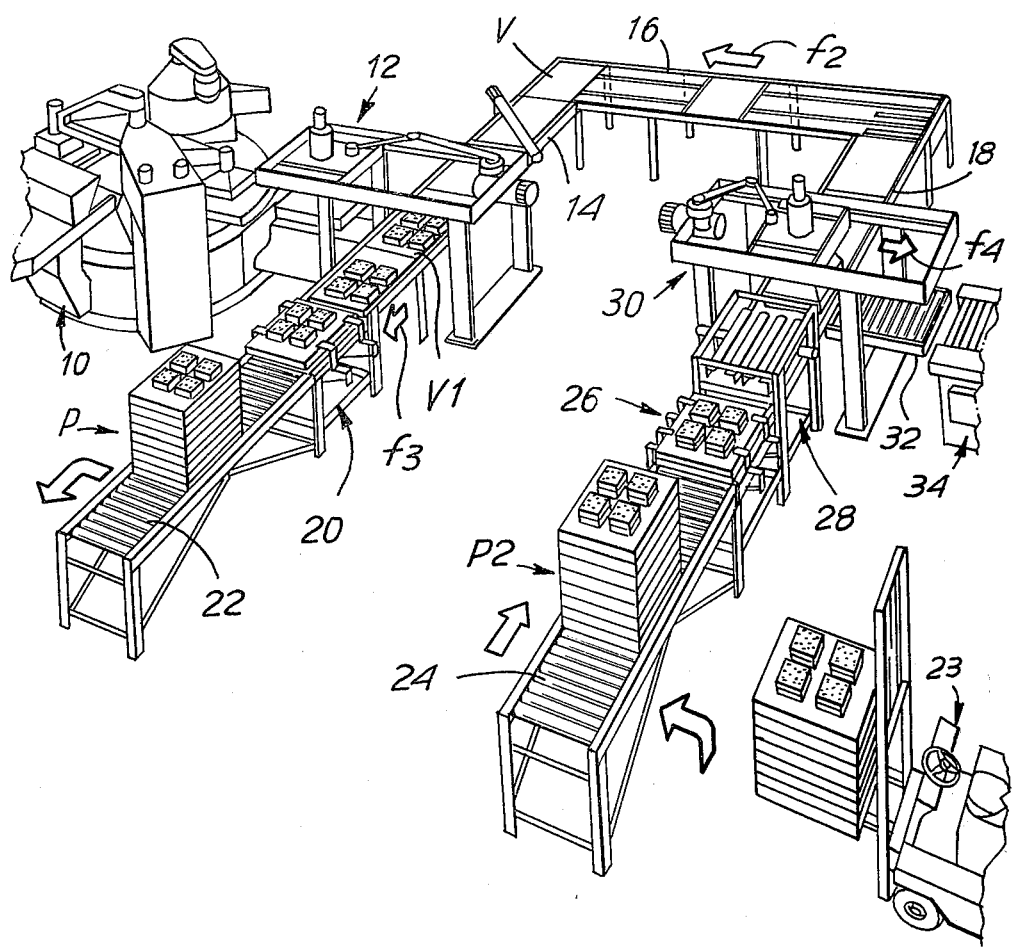
FIG. 1 shows a perspective overall view of a plant according to the invention.
Figure 2:
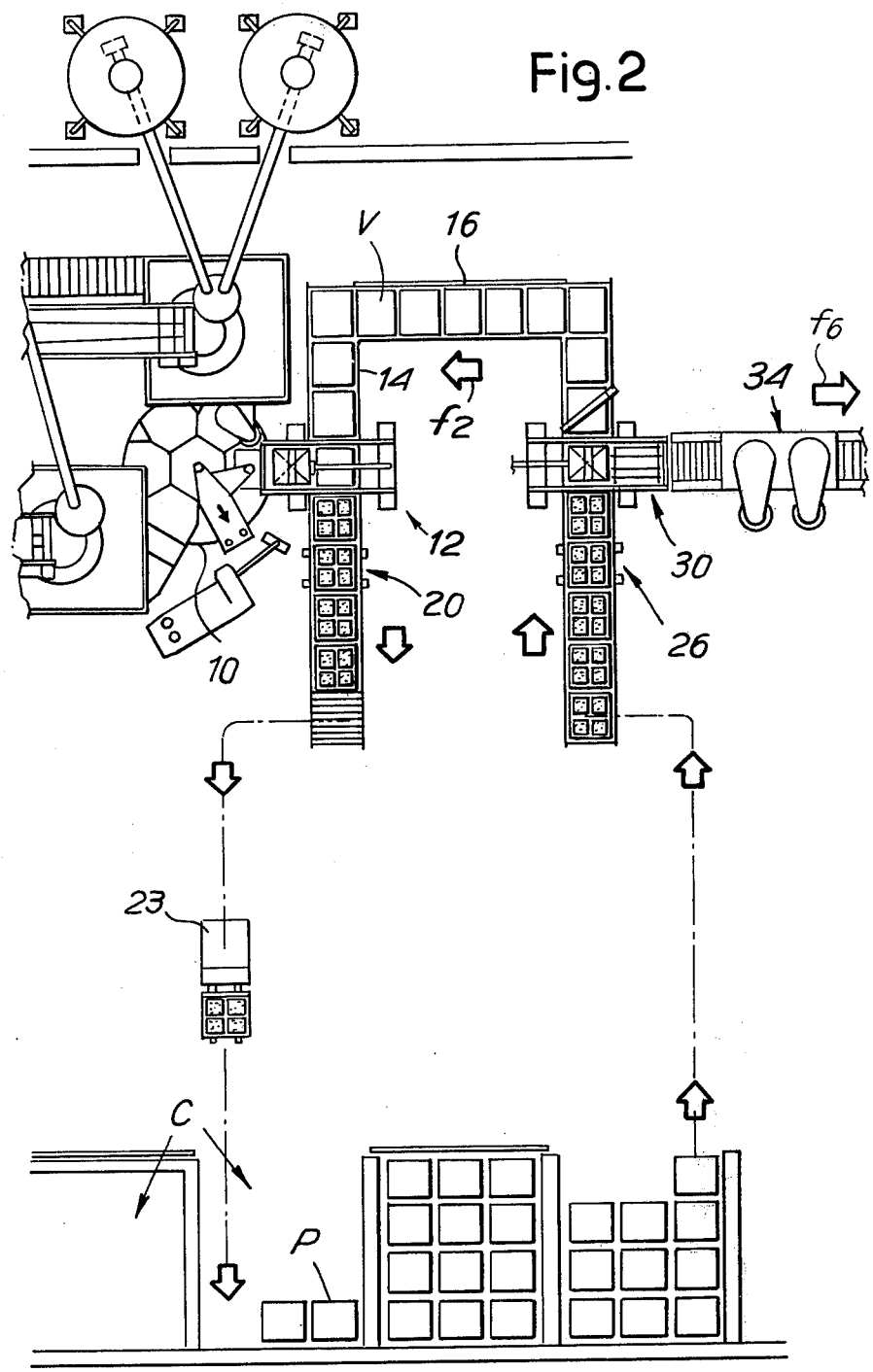
FIG. 2 shows a plan view.
Figure 6:
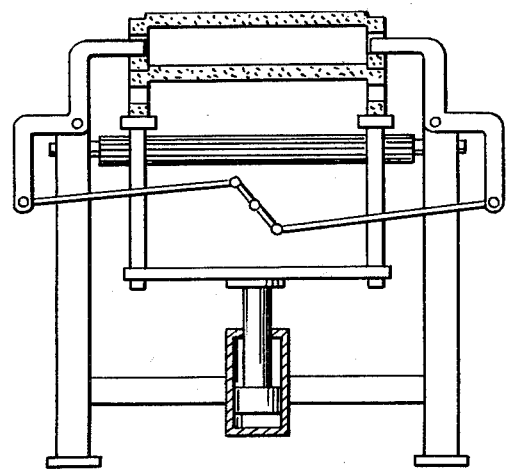
Figure 7:
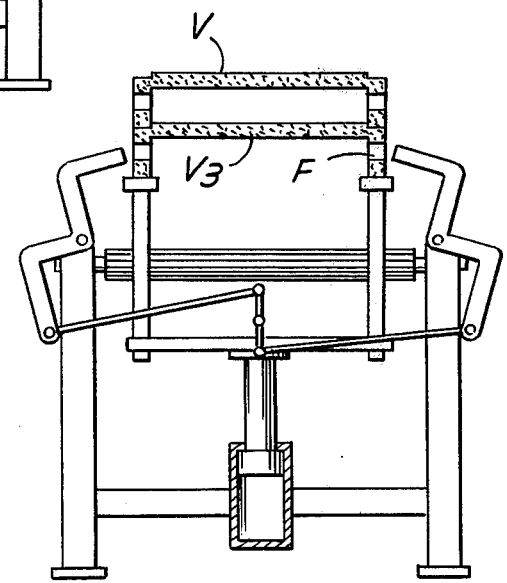

At first making reference to FIGS. 1 and 2, 10 denotes the press from which the tiles are taken from the molds by means of a device 12 of any type per se known in the art (such as that illustrated in FIGS. 29 to 34), to be deposited, i.e. laid down on a tray V1 which is in a reception position for said tiles. The trays V, designed to reach the position V1 to receive the tiles, come from a track 14, 16, 18 according to the arrow f2. The trays with the tiles follow—along the guides on the track 14—the path according to the arrow f3, to reach a piling device 20, in which the several trays are stacked to form piles P of trays which are then entrusted to roller tracks 22 or the like, to be forwarded to the seasoning cells with automated system or simply with a fork truck or the like, like that denoted by 23.

A pile of trays P2 coming from a seasoning system is moved along a roller track 24 to reach an un-piling device 26 from which the single trays with the tiles are forwarded towards the track 18. When each tray has more tiles piled up upon one another, the trays from the un-piling device 26 are forwarded to a staggering device 28 (better described later on) which causes a slight displacement of the tiles of each pile in its plane in respect of the adjacent ones, so as to assure the detachment and facilitate taking or picking up of the tiles even if these latter had slightly adhered to the adjacent tiles during the previous treatments. The trays with the tiles separated reach a taking or picking up device of a per se known type to be forwarded according to the arrow f4 to the circuit for further working or use; this circuit can include a sliding plane 32 and, for instance, a smoothing group 34, which is travelled by the tiles in the direction of arrow f6. Further processing of the material can take place downstream of group 34. In a per se known manner the single trays slide along the tracks described and in a similar manner the piles of trays like those P and P2 are advanced and can be handled with fork trucks or the like. The fork trucks 23 for instance can be used to place the tracks of trays P in seasoning cells C and can pick up the piles P2 of trays of seasoned tiles from the cells to place them on track 24.

The handling of the single tiles from press 10 to tray V1 in a reception position of the tiles to be seasoned, and the picking up from the trays coming from the un-piling device 26 to be forwarded to tracks 32, 34, can be obtained with systems of the sucker type, or the like, per se known in this particular art.

Figure 24:
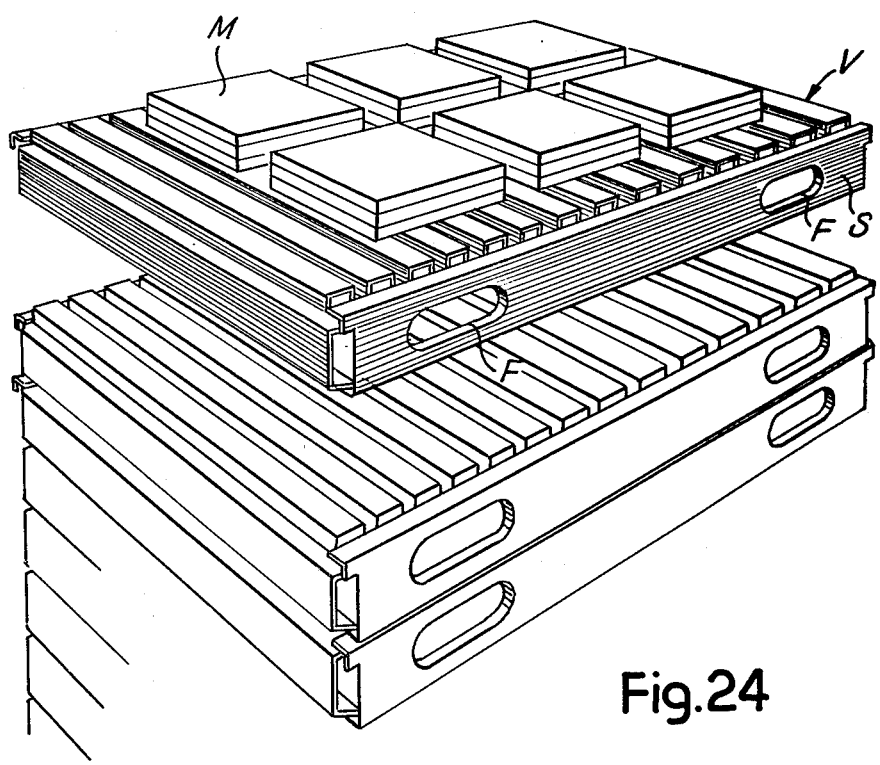
Figure 40:
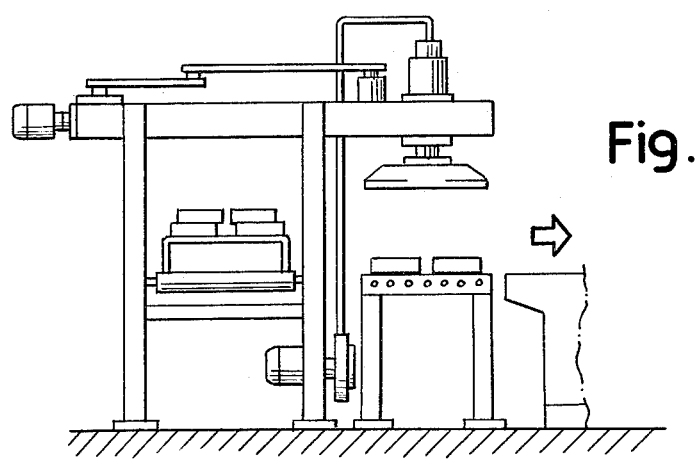

FIGS. 3 to 8 show the piler device of trays, generally denoted by 20 in FIGS. 1 and 2, 40 denotes the rollers of an advance track for the trays arriving from the charging position denoted by V1, and supporting the tiles; these latter can be prearranged also piled up upon one another (generally not more than three or four specimens). The trays V are provided with side banks S having a pair of holes F (see also and in particular FIG. 24); the trays also have suitable support surfaces and appropriate reinforcements to avoid their deformation and thus the deformation of the tiles they support. In FIG. 24 a tray is shown which has six piles each consisting of three tiles M.

Figure 8:
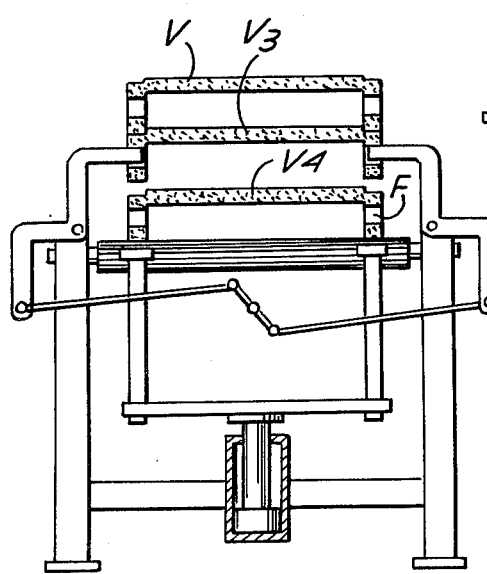
Figure 15:
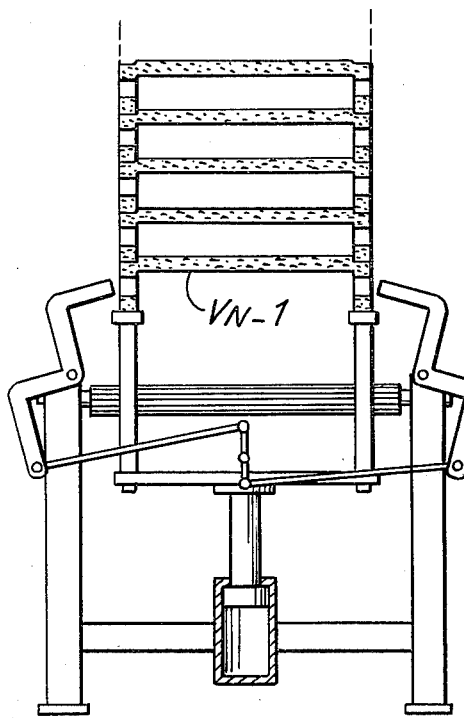
Figure 16:
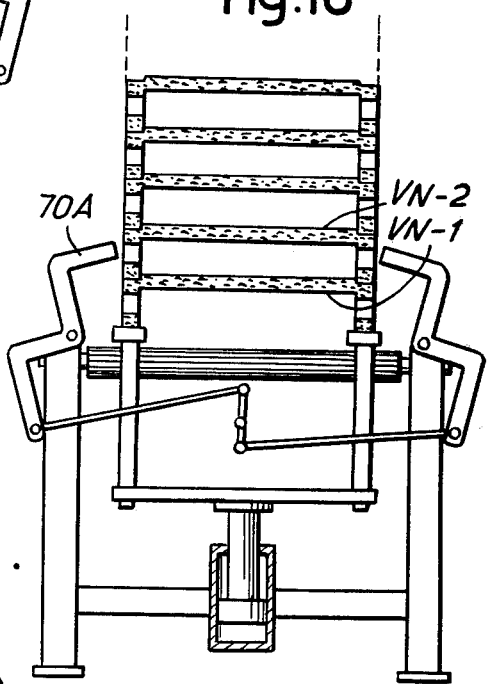
Figure 17:
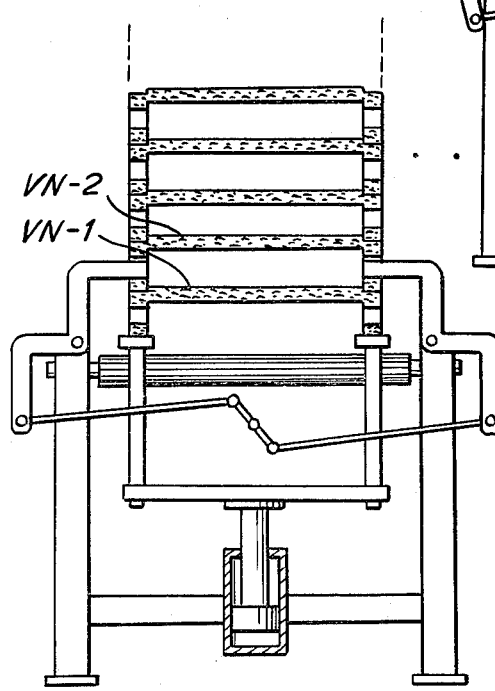
Figure 18:
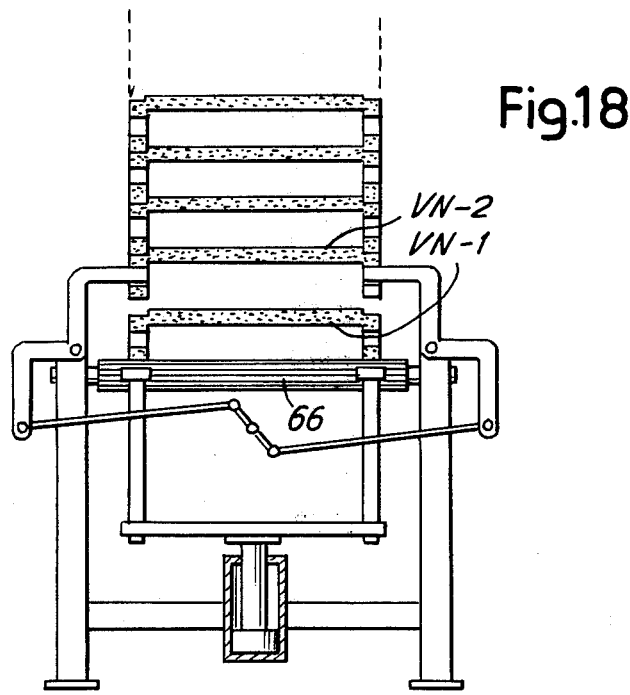
Figure 19:
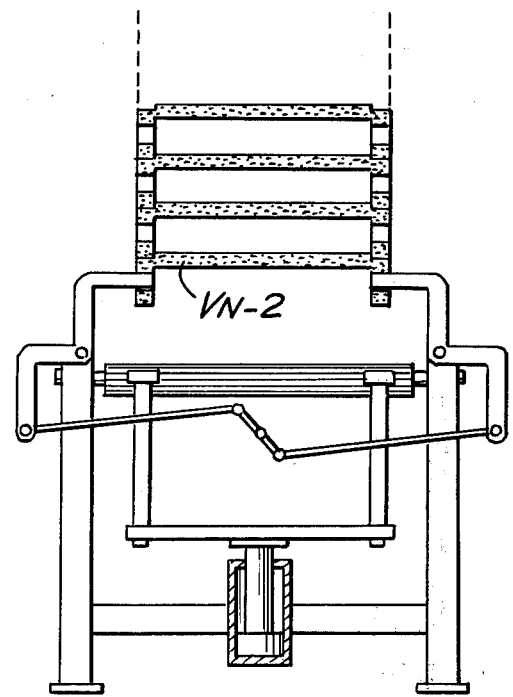

Lifting stems 42 are provided intercalated between rollers 40 of an advance track of a tray, in correspondence of the piler device 20. The stems 44 are part of unit 44 which is actuated by a cylinder-piston system 46 carried by the frame 20A of the piler. On frame 20A are also pivoted at 48 symmetrically in respect of the trays advance track symmetrical oscillating units or grippers 50 operated by a linkage 52 with intermediate rocker arm pivoted in 54; the units 50 have each a pair of extensions 50A that can penetrate into the holes F of a tray lifted as shown in FIG. 4. When a tray V with the tiles placed on it reaches the piler 20, the units 50 are moved so as to spread the extensions 50A and the unit 42, 44 is lifted from the conditions of FIG. 3 to the conditions of FIG. 4, so that the arriving tray is presented with the holes F aligned with the extensions 50A (see FIG. 4); then the units 50 are operated to insert the extensions 50A into the holes F, in order to reach the arrangement of FIG. 5 in which—by re-lowering of unit 42, 44—the arrival of a second tray denoted by V3 is possible, this tray assuming the position of tray V of FIG. 3 below said raised tray V. The tray V3 is partially raised until it approaches tray V (see FIG. 6) and afterwards the units 50 are operated to spread extensions 50A and the unit 42, 44 further raises the pair of trays V and V3 to the arrangement of FIG. 7, so that extensions 50A penetrate into the holes F of said tray V3 (see FIG. 8) allowing to keep the pile of trays V, V3 lifted. After re-lowering of unit 42, 44 as shown in FIG. 8, a further tray V4 can arrive, that is also raised until it approaches the pile, allowing its support by withdrawing the extensions 50A and raising the pile V, V3, V4 until the holes F of tray V4 are brought to the level of extensions 50A, so that said extensions can be inserted into said holes and the pile being formed, as described, can be kept raised and the operations concerning arrival and lifting of further trays can prosecute, to form finally a pile P as shown in FIG. 1. When pile P has been completely formed in piling device 20, it is positioned at the level of track 22 and pushed by mechanical means or also manually on said track 22, to be taken for instance by the fork trucks 23 or other means provided for handling the piles moving them towards or form the seasoning cells, or towards and from the even continuous seasoning furnaces.

A device similar to the piling device is provided to un-pile the piles of trays P2 which reach said un-piler device 26 through the rolling tracks 24 with the seasoned tiles. As it is shown in FIGS. 9 to 20, the un-piler 26 includes on a frame 58 and having mounted thereon a cylinder-piston system 60 which is designed to raise and lower a unit 62 comprising stems 64 that can pass between contiguous rollers of a roller track 66, on which the pile P2 of trays arriving with seasoned tiles slides. On the frame 58, are linked two units 70 similar to units 50 of the piler 20 and similarly operated by a linkage 72 with intermediate rocker arm pivoted at 74. The units 70 are provided with extensions 70A that can penetrate into the holes F of the trays of pile P2. When pile P2 has reached the position shown in FIG. 9 on the un-piler 26, the unit 62, 64 is lifted (FIG. 10), until the lower tray of the pile is brought into the arrangement of FIG. 11, to let insert extensions 70A into the holes F of the penultimate tray VN-1 of the pile, while the last tray VN of the pile is kept raised by unit 64, 62. This unit from the conditions of FIG. 11 is lowered to the arrangement of FIG. 12, wherein the tray VN is laid on the roller track 66 while tray VN-1 and the remaining pile are still supported by extensions 70A (see FIG. 12); tray VN is then moved away (see FIG. 13) and subsequently (FIG. 14) the unit 62, 64 is lifted to contact the tray VN-1 and to move in this way, by moving away extensions 70A, the pile downwardly (see FIG. 15) until tray VN-2 is brought to the level of extensions 70A (FIG. 16) for the engagement by these extensions (see FIG. 17), while tray VN-1 is supported by the unit 64, 62 that rests it on the roller track 66 so that it can be moved away (see FIGS. 18 and 19) as tray VN.

Substantially the un-piler device forwards to the subsequent group 30, the single trays with the seasoned tiles, after one another instead of piled up.

Figure 20:
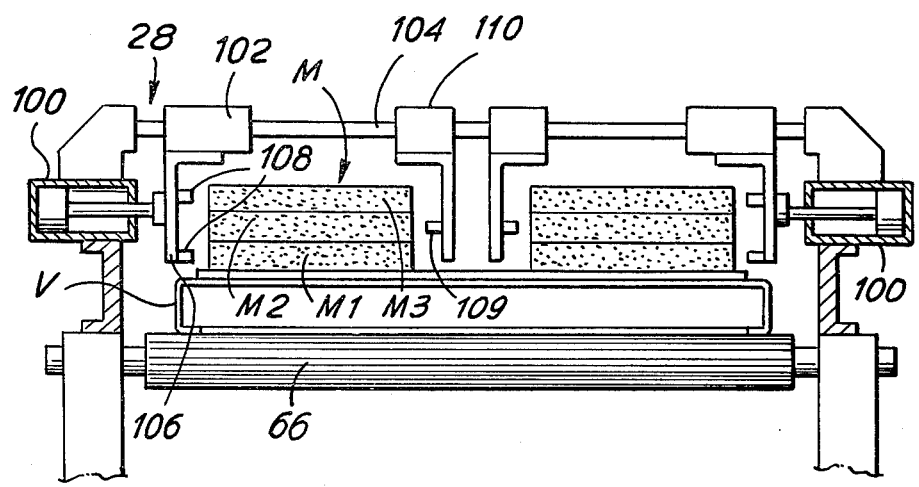
FIGS. 20 and 21 show a device designed to offset the tiles piled up to secure the pick up thereof.
Figure 21:
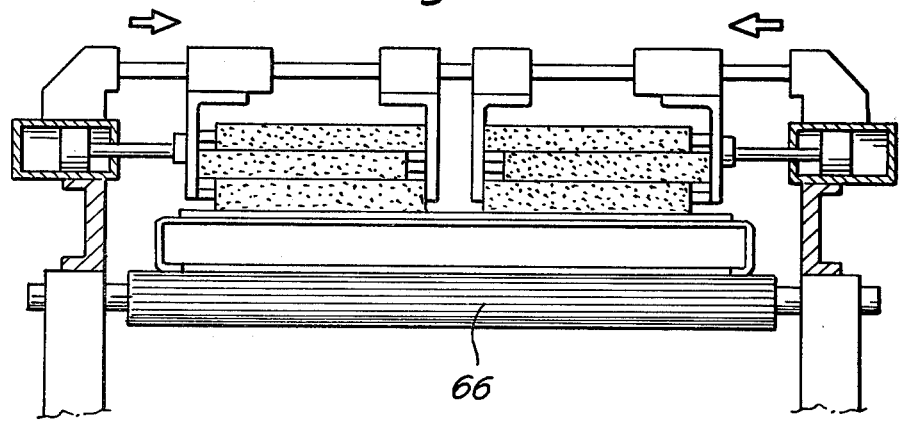
Figure 22:
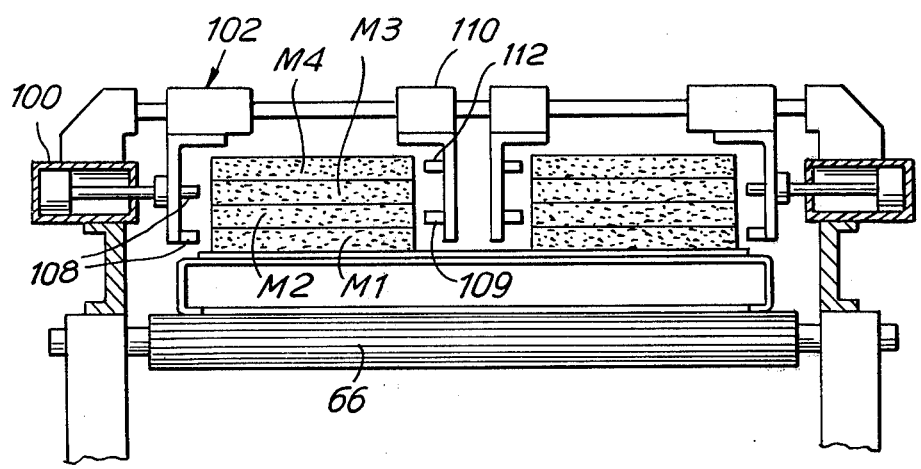
FIGS. 22 and 23 show a variation of the device of FIGS. 20 and 21 for piles of tiles in a different number.
Figure 23:
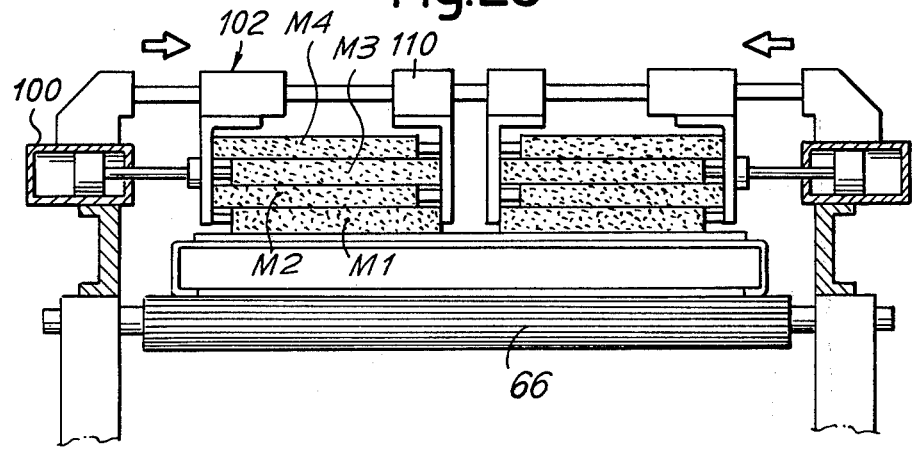

Before reaching the group 30, the single trays are subjected to the action of a staggering device 28 better illustrated in FIGS. 20 to 23. This device includes at least a cylinder-piston system 100 or, better, two opposite cylinder-piston systems 100, which, or each of which actuates a unit slidable transversal to the transit direction of the material. The unit controlled by a system 100 includes a shoe 102 slidably guided in a guide 104 and provided with an extension 106, which is connected with the piston stem of system 100 and in turn is provided with two projections 108 in the form of straight edges or the like which can act on two tiles of a pile of tiles M that are spaced from each other by the interposition of a further tile. In particular, in the embodiment of FIGS. 20 and 21, the projections 108 act on the tiles M1 and M3, while tile M2 is at the level of a projection 109, which is borne by a stationary support 110 engaged for instance on the guides 104. The same arrangement is repeated on opposite sides of the tray on which there are two piles of tiles M1, M2, M3 in FIGS. 20 and 21. In the arrangement of FIGS. 22 and 23 each pile includes four tiles M1, M2, M3 and M4, and the support 110 in this case is provided with two projections 109 and 112, which are aligned with the tiles M2 and M4 and offset in respect of projections 108 which act on tiles M1 and M3.

At the arrival of a tray with the two piles of tiles, the staggering device is in the arrangement of FIG. 20 or respectively in the arrangement of FIG. 22. When the tray has stopped at the staggering device, by operating the cylinder-piston systems 100 a movement of unit 102 is determined from the position of FIG. 20 to the position of FIG. 21, respectively from the position of FIG. 22 to the position of FIG. 23. Thereby a staggering is caused between the even place tiles and the odd place tiles, as the pile of tiles M is approached to the projections 109, respectively 109, 112 of the support 110 and then the odd place tiles are pushed by the projections 108 so as to slide in respect of the even place tiles, which are stopped by the projection 109, respectively by the projections 109, 112. The tiles of a same pile, which can possibly have adhered to one another as they have been laid down fresh and seasoned piled up on one another, are detached from one another, to thus facilitate taking, i.e. picking up of the single tiles by means of the subsequent group 30 which has to forward them to further working or however to track 32 and downstream track 32. Obviously, after the systems 100 have caused the staggering between the tiles of the same pile, as shown in FIGS. 21 and respectively 23, the shoes 102 are again displaced outwardly and the tray can advance with the tiles offset, until it reaches group 30. The offsetting of the tiles of a same pile does not disturb the picking up by the group 30 and placing of the tiles to be forwarded to the working chain or conveyor derived from group 30.

The tray, freed from the tiles in group 30, is forwarded on tracks 18, 16 and 14, to be presented again to the assembly 12 which takes the tiles from press 10 and piles up the tiles on the same tray.

Figure 25:
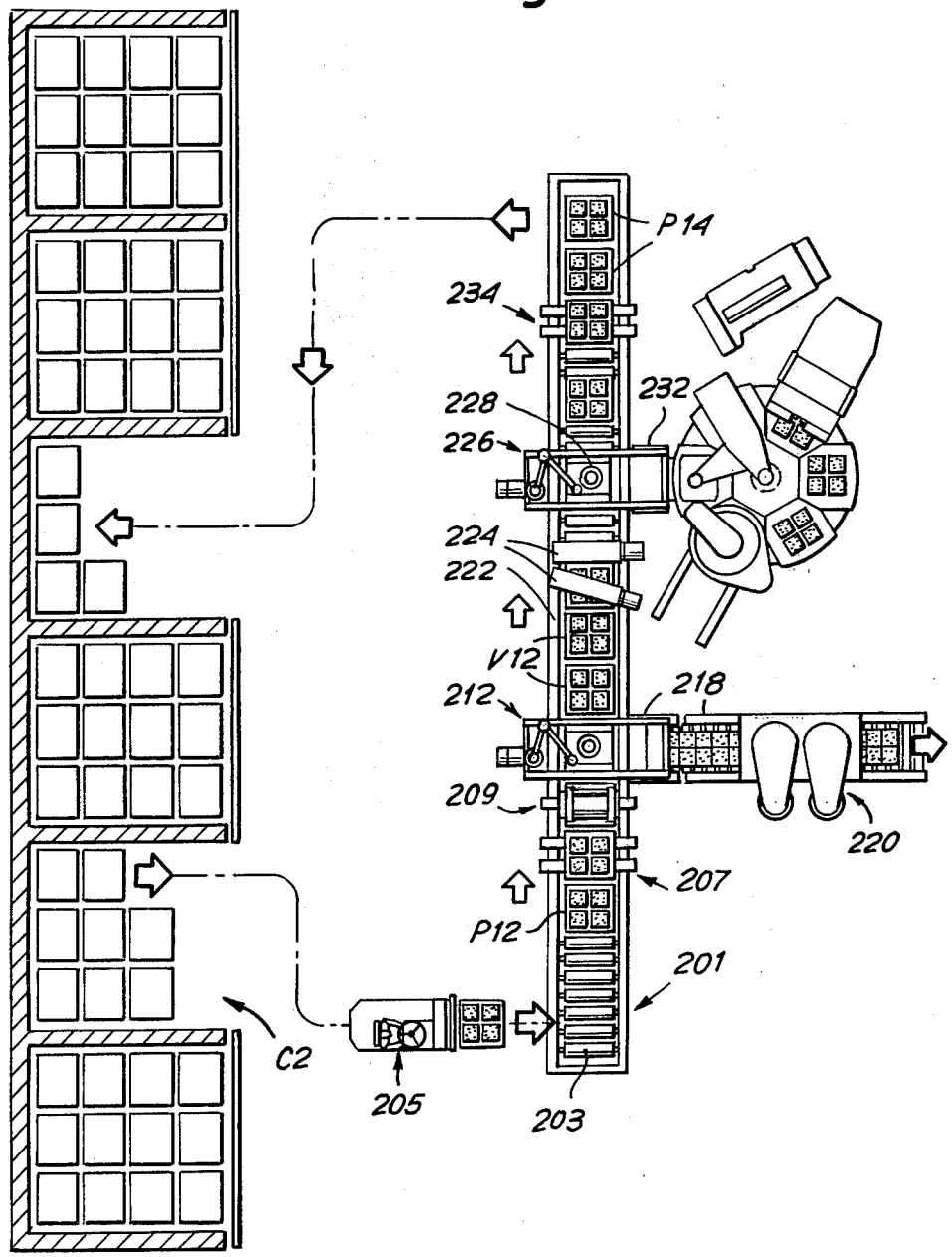
FIGS. 25 and 26 show in a plan view and perspectively a plant in a modified embodiment.
Figure 26:
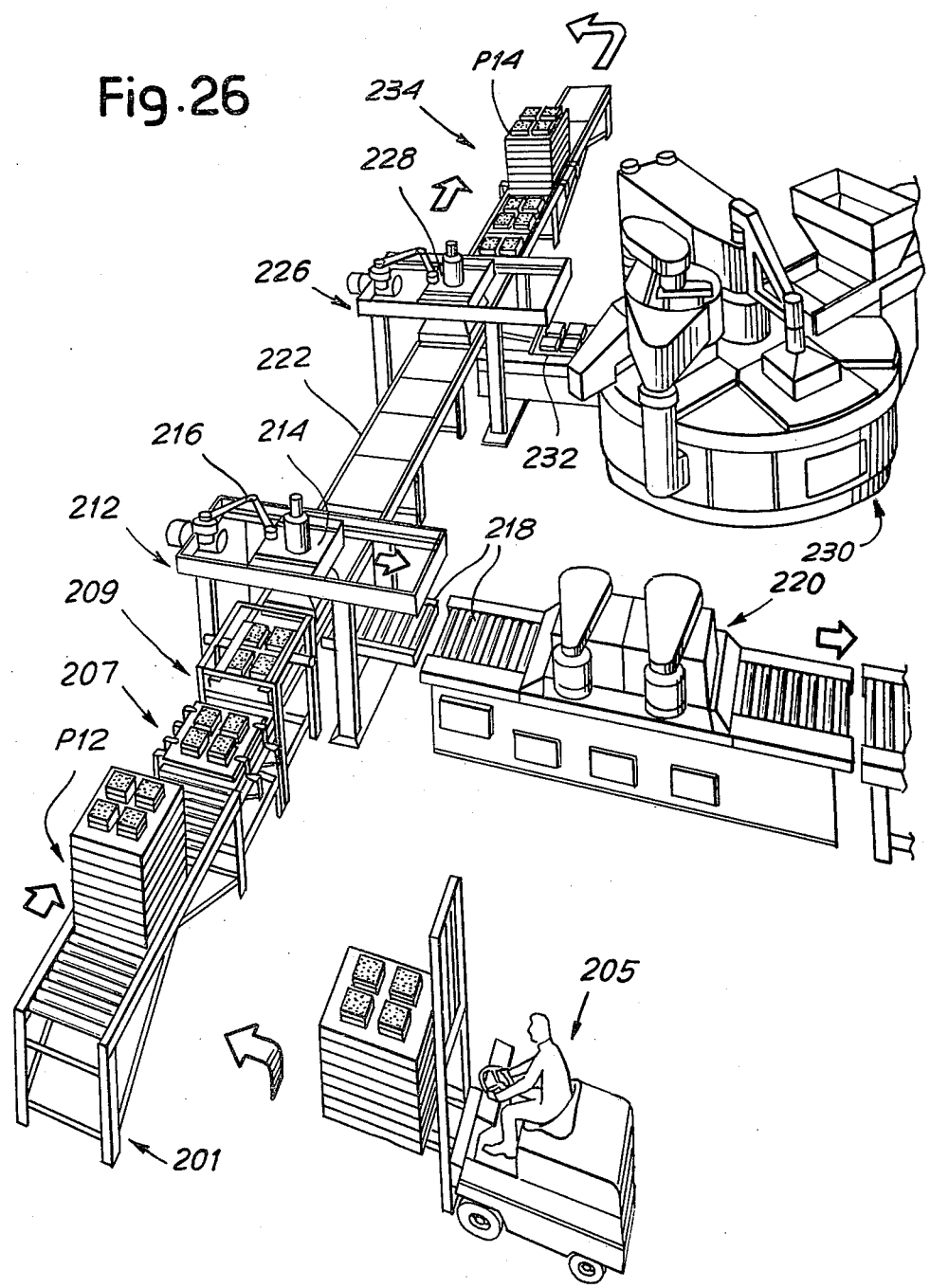

FIGS. 25 and 26 show a modified embodiment in respect of that of FIGS. 1 and 2 of the previous example, as the guides for the sliding of the piles of trays and of the trays are made as a rectilinear or in line assembly, instead of under a U form as in the previous case.

In FIGS. 25 and 26 a rectilinear structure 201 is provided with a roller guide 203 for piles P12 of trays coming from the seasoning cells C2, which trays can be transferred for instance by means of trucks 205. By 207 an un-piling staggering device is denoted to forward single trays with the tiles through a device 209 which is adapted to offset or stagger the tiles of each pile borne by the tray, detaching from one another the tiles that can possibly have adhered to one another during seasoning. The trays with the tiles reach a pick up assembly 212 with a unit of vaccum means or suckers 214 movable transversally with a crank system 216, better illustrated in FIGS. 35 to 40. The unit 214 lays down the seasoned tiles on a guide 218, designed to forward them to further workings such as smoothing under smoothing machines 220.

Trays V12 without tiles are forwarded along a track 222 to a cleaning group 224 (s. FIG. 25) to reach then a position under an assembly 226 for charging the fresh tiles and better illustrated in FIGS. 29 and 34. This assembly includes a unit 228 movable transversally and adapted to pick up with vacuum suckers the tiles supplied by a press 230 on an outer platform 232. The trays with the tiles are forwarded to a piling device 234 and piles P14 are transferred to cells C2 for seasoning.

Figure 27:
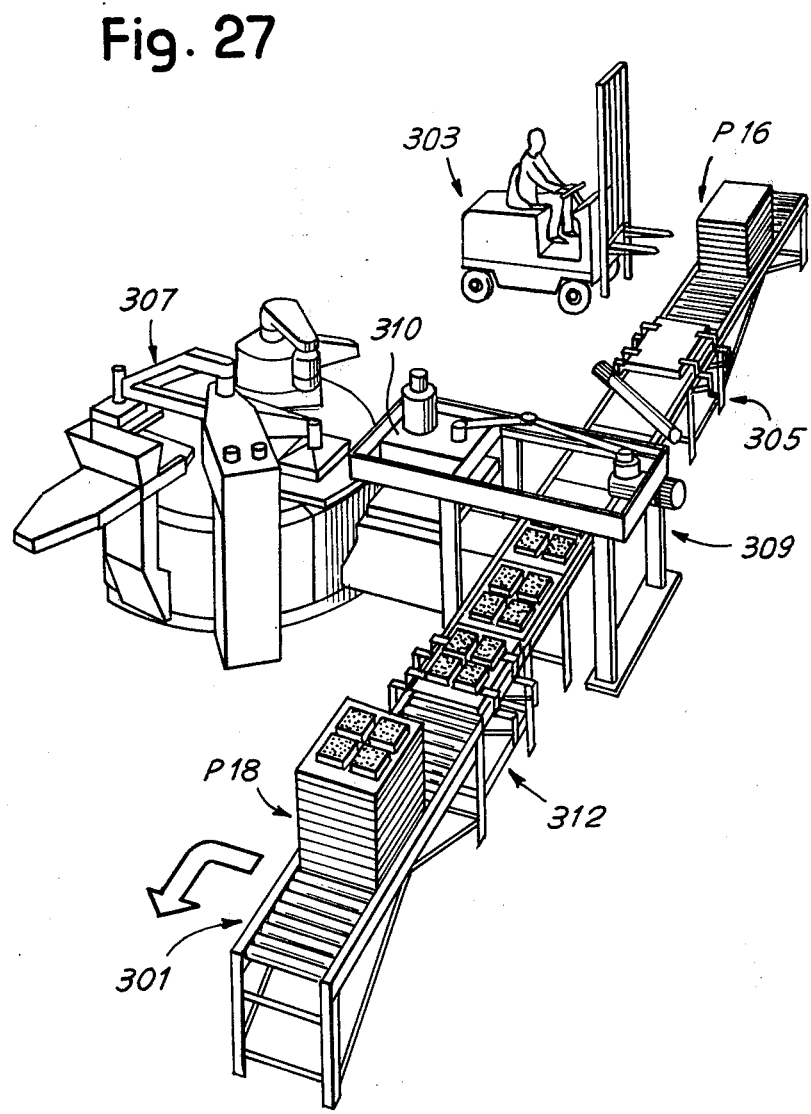
FIGS. 27 and 28 show perspectively two separate assemblies of a plant according to a further modified embodiment.
Figure 28:
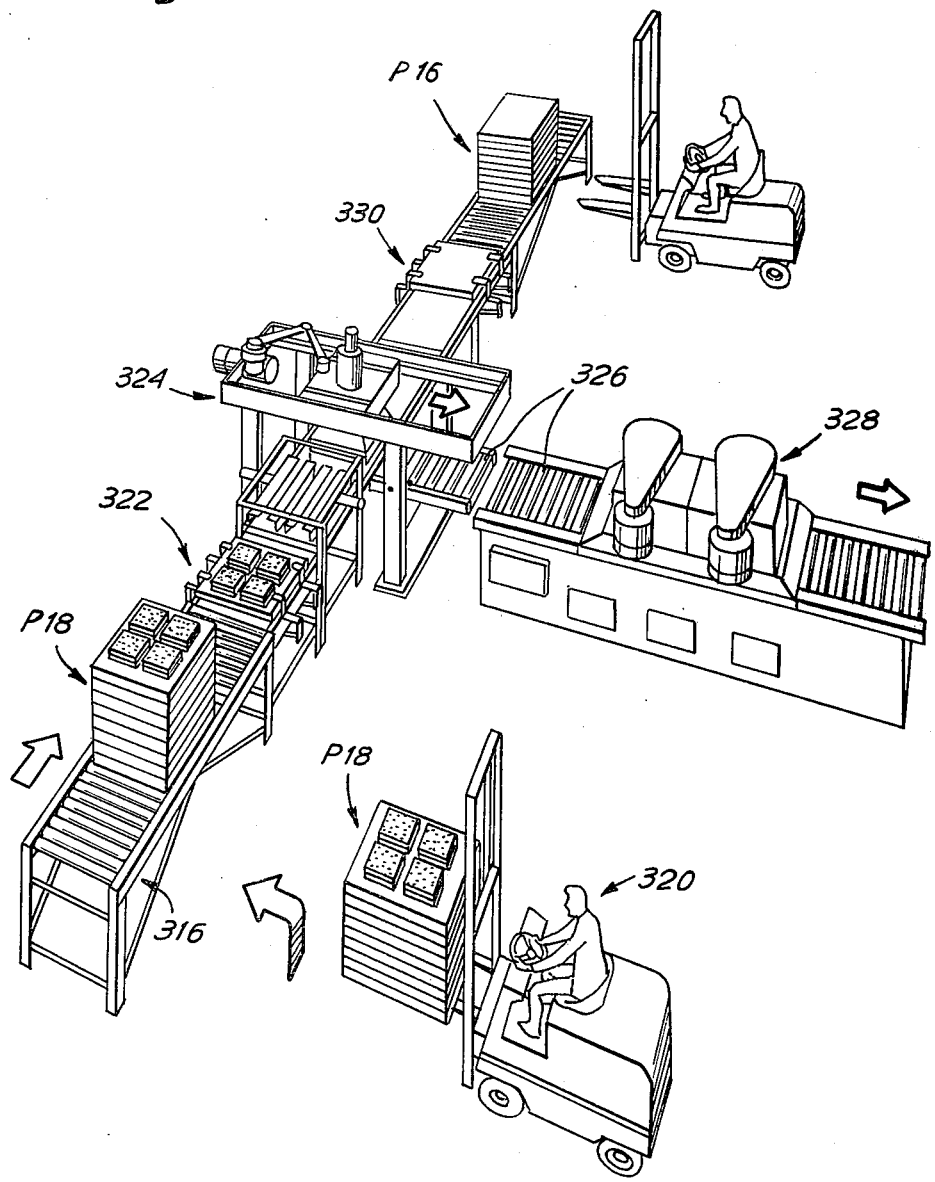
Figure 29:
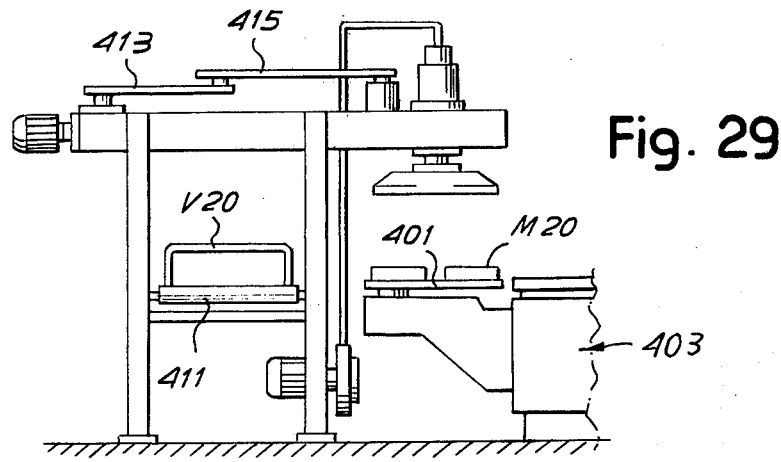
FIGS. 29 to 34 show in several working stages a device for transfer from the press to a tray.
Figure 30:
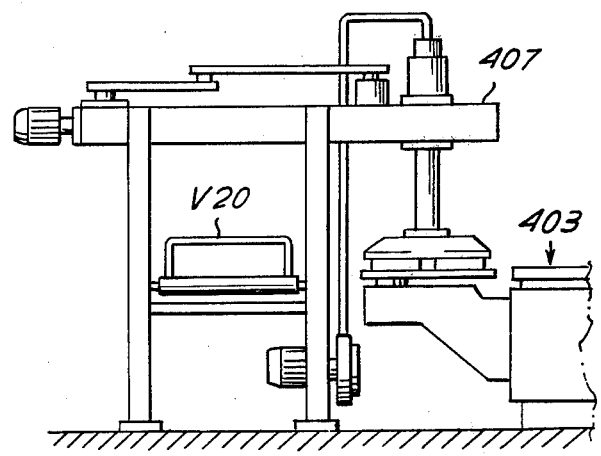
Figure 31:
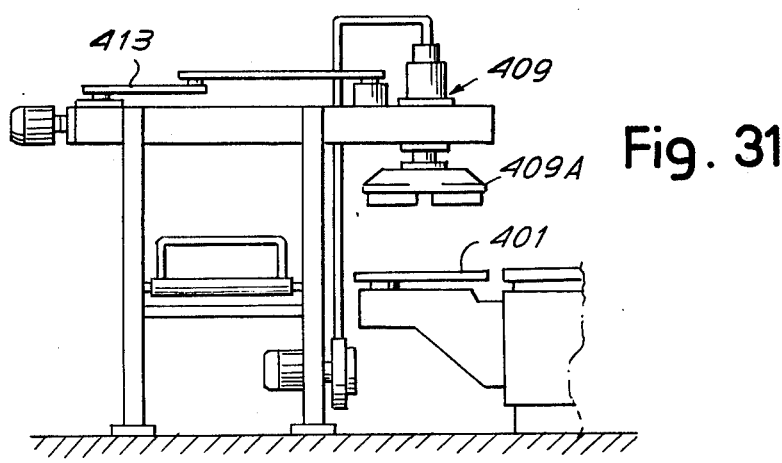
Figure 32:
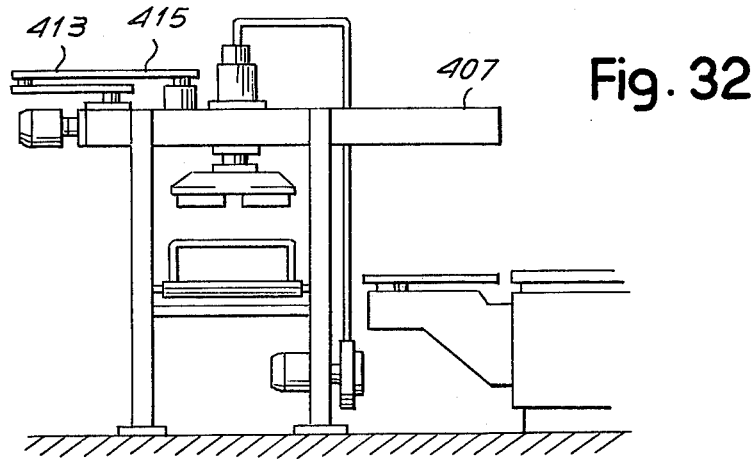
Figure 33:
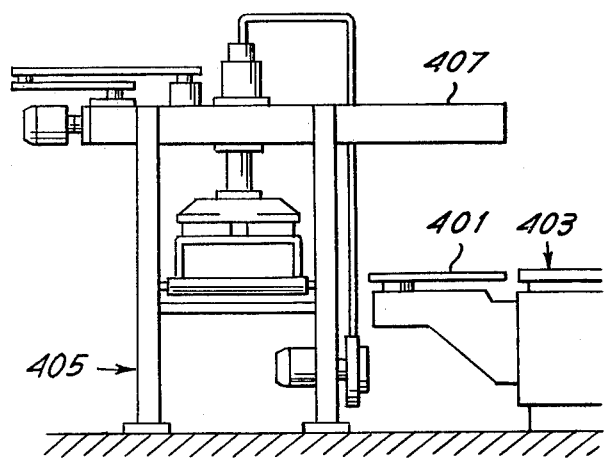
Figure 34:
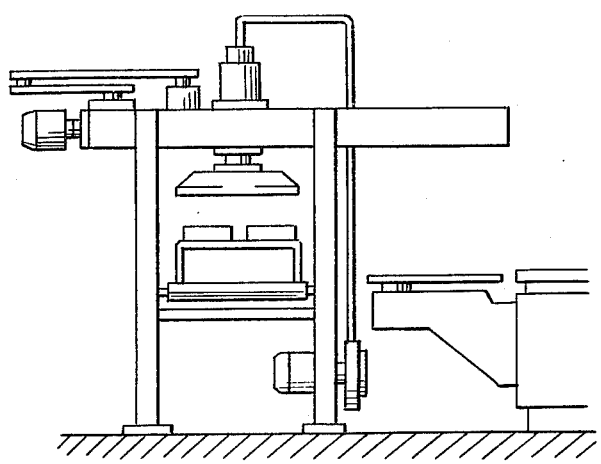
Figure 35:
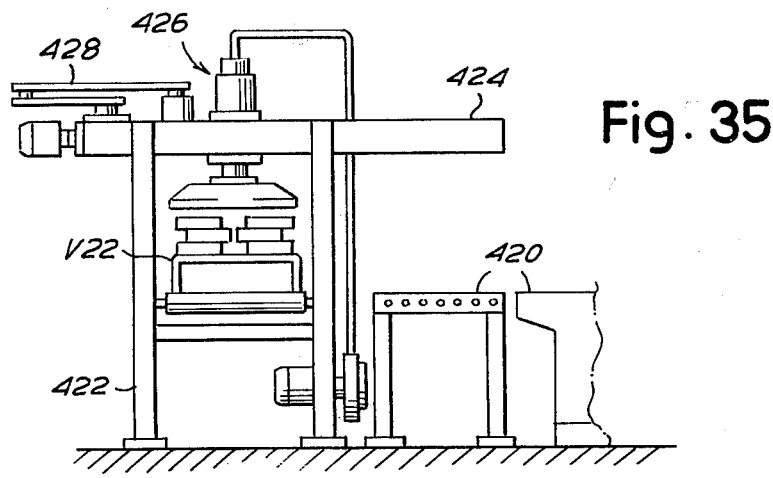
FIGS. 35 to 40 show in several working stages a device to pick up the tiles from a tray to a conveyor that feeds the same to a smoothing machine.
Figure 36:
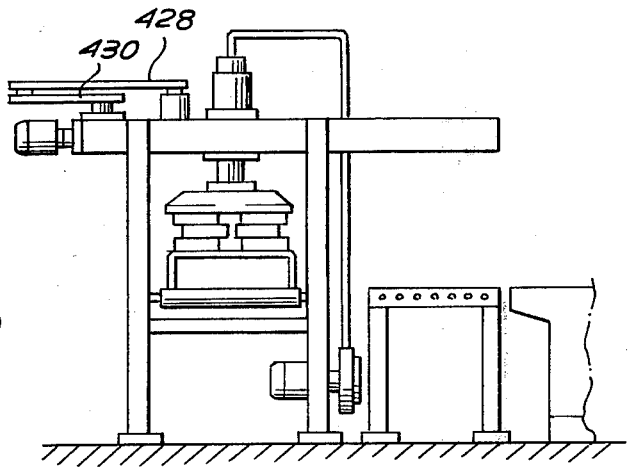
Figure 37:
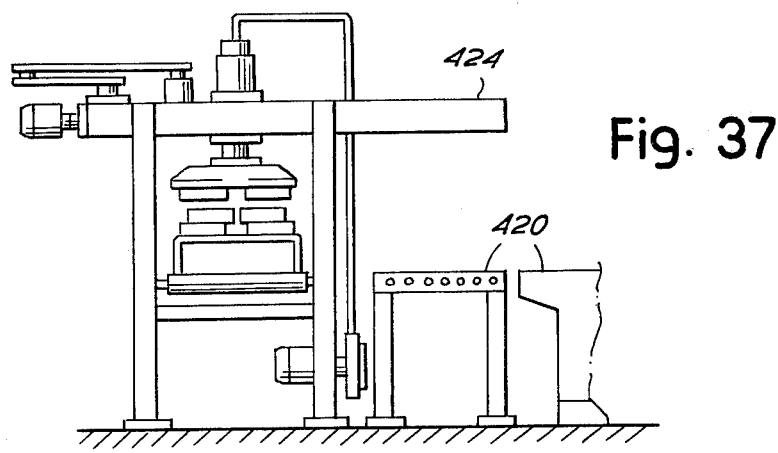
Figure 38:
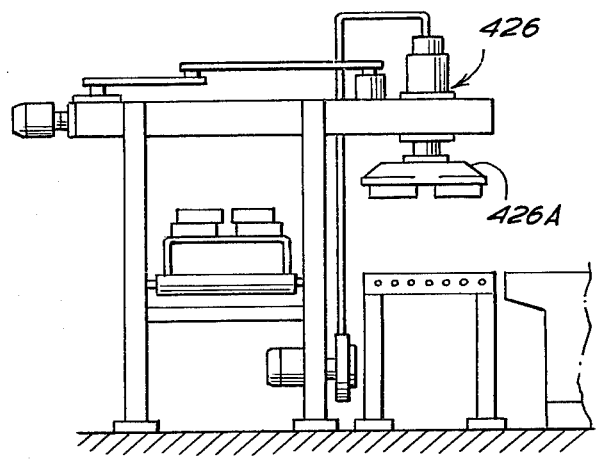
Figure 39:
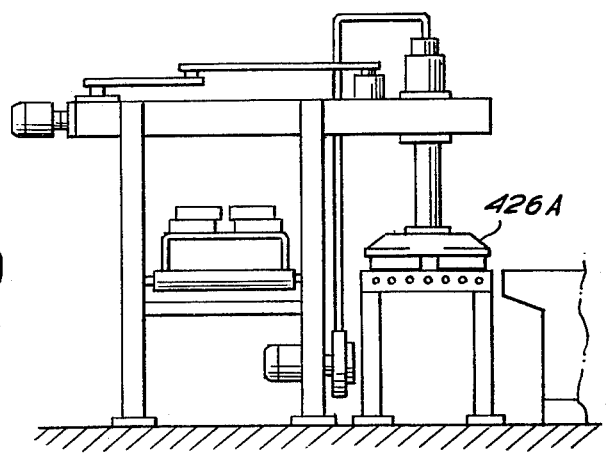

FIGS. 27 and 28 illustrate perspectively a further embodiment of a plant consisting of two sections illustrated separately in said FIGS. 27 and 28. One of said sections (shown in FIG. 27) includes a rectilinear track 301 on which piles P16 of empty trays are supplied by means of a conveyor truck 303 from a suitable stow position; the trays are un-piled in an un-piling device 305, unless the single trays are supplied selectively on the rectilinear track. Anyway the trays reach a reception position of fresh tiles, which from a press 307 are transferred on the trays by an assembly 309 bearing a unit 310 with transfer suckers. Tiles laid on one another form piles of two, three or more tiles, on the trays. The trays with the fresh tiles are then transferred to a piling device 312 to form piles P18, which are transferred to the seasoning cells.

An independent structure 316, also forming a rectilinear track, can receive th piles P18 of trays coming—by means of carriages 320 or else—from the seasoning cells, to forward them to an un-piling device 322. The single trays are then forwarded to a transfer transversal device 324, having suckers or the like, to be forwarded to a track 326 that brings the tiles to a further working, for instance under a smoothing machine 328. The trays freed from the tiles are piled up again in a device 330, to form piles P16 which are transferred through carriages to the stocking place, to be then forwarded again to track 301.

By this arrangement the two assemblies are made independent, so that each can work at the rhythm required for each of them.

FIGS. 29 to 34 show a device like that 226 and 310, and like that 12 of the previous example, to transfer the tiles from a platform or shovel 401 to a tray V20 ready to receive the tiles stripped from a press 403. Such an arrangement is illustrated for instance in French patent application No. 76 19520 of June 25, 1976; in German patent application No. P 26 27 660.8 of June 19, 1976; in Japanese patent application No. 75657/76 of June 28, 1976; in Spanish patent application No. 449201 of June 25, 1976 (granted on Apr. 27, 1977); in U.S. patent applications No. 694,548 of June 10, 1976 and No. 870,521 of Jan. 18, 1978.

A frame 405 forms raised guides 407 for a carriage 409 which lowerly bears an assembly 409A for suckers designed to pick up the tiles M20; said assembly 409A can be lowered and raised with a fluid system or the like. Carriage 409 is moved from a position above shovel 401 to a position above tray V20 (being on its sliding track 411) by means of a crank 413 and a connecting rod 415, which form a linked system like that 216. The synchronization among the lowering and raising movements of unit 409A, transferring of carriage 409 in horizontal and transversal direction, and operation of the suckers, allows to transfer the tiles stripped on the trays as they arrive.

FIGS. 35 to 40 show in more detail several steps of tiles transfer from piles of tiles on a tray V22 to a track 420, to be forwarded to a smoothing machine or else. Also in this embodiment a structure 422 is provided, forming guides 424 for a carriage 426 actuated through a crank 428 and a connecting rod 430; the carriage 426 bears a unit 426A movable vertically and bearing suckers for the transfer of the tiles.

It is intended that the drawing only illustrates an example given only as a practical embodiment of the invention, as said invention can be varied in forms and arrangements without however departing from the scope of the invention.

I claim:

1. An apparatus for handling articles of manufacture such as tiles and the like for transporting said articles sequentially through a plurality of operating stations comprising: a first conveying means, a charging station disposed adjacent said first conveying means, a plurality of trays adapted to be disposed on said first conveying means whereby said first conveyor means advances said trays seriation toward said charging station, said charging station including means for stacking said articles onto the trays in said charging station, a tray piling station disposed downstreamwise of said charging station, said tray piling station having means for stacking a plurality of trays containing said stacked articles one upon the other as the respective trays pass through said charging station, a second conveyor means adapted having an end portion adapted to receive a plurality of stacked trays containing subsequently processed articles, a tray unpiling station associated with said second conveyor means, an article pick up station disposed downstreamwise from said unpiling station whereby the processed articles are removed from said unpiled trays, said tray unpiling station including means for sequentially removing said trays from said stacked trays whereby said unstacked trays are sequentially advanced toward said pick-up station to effect the removal of the articles from said trays, and said emptied trays being recycled to said first conveyor means on an interconnecting conveyor for advancement toward said charging station.

2. The apparatus as defined in claim 1 wherein said piling station and unpiling station includes a frame, lifters mounted on said frame for movement between a raised and lowered position, means connected to said lifters from sequentially raising and lowering of said lifters, opposed oscillating grippers pivotally connected to said frame for gripping and supporting a tray disposed in said piling station, means interconnecting said gripper for operating said grippers in unison, and said grippers being operative to grip a tray and hold a tray during the stacking or unstacking of said trays in the respective piling or unpiling station.

3. The apparatus as defined in claim 2 wherein said first and second conveyor means each include a plurality of spaced apart rollers, and said lifters of said piling and unpiling stations being disposed between said rollers at their respective stations.

4. The apparatus as defined in claim 1 and including a staggering station disposed between said unpiling station and said pick-up station whereby said stacked articles on said trays are staggered in advance of said pick-up station.

5. The apparatus as defined in claim 1 wherein said first and second conveyor means are each rectilinearly disposed.

6. The apparatus as defined in claim 1 wherein said first and second conveyor means are disposed substantially parallel to one another, and said interconnecting conveyor disposed between the charging and pick-up station of the said first and second conveyor means, said interconnecting conveyor conveying the emptied trays from said pick-up station to said charging station.

7. The apparatus as defined in claim 4 wherein said staggering station includes a pair of spaced apart shoes, said shoes being disposed on opposite sides of a stack of articles disposed on a tray being conveyed through said staggering station, means for moveably mounting said shoes for relative movement toward and away from said stacked articles on said tray, and said shoes having opposite and staggered projections for shifting alternate articles of said stacked articles to effect a slight dislodgement of said stacked articles relative to one another when said shoes are moved toward said stacked articles.

* * * * *